Nov. 20, 1951  C. DODD  2,575,334
HIGH-FREQUENCY TUNING APPARATUS
Filed March 14, 1944  3 Sheets-Sheet 1
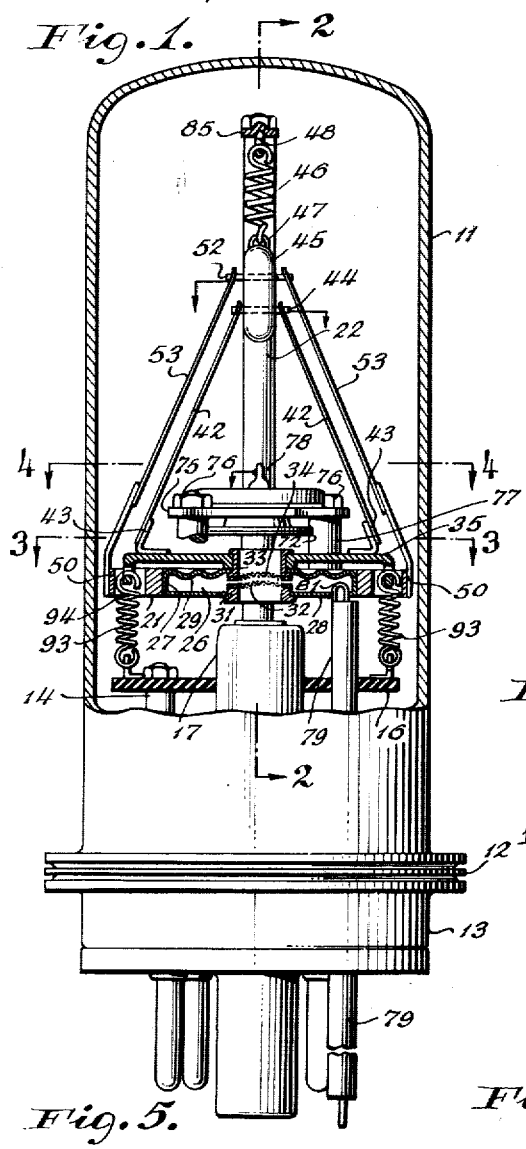
Fig. 1.
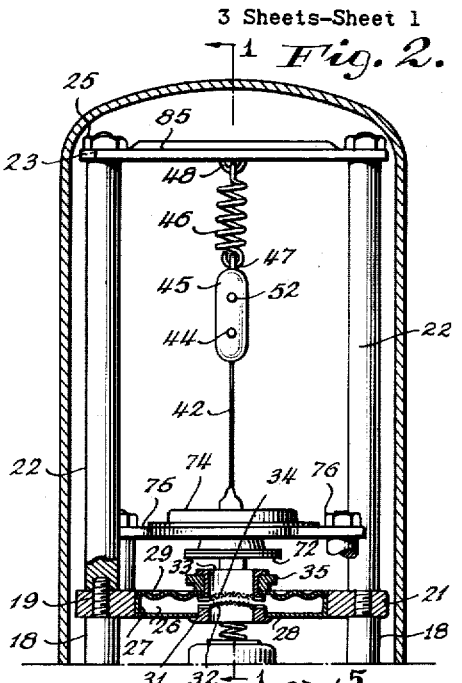
Fig. 2.
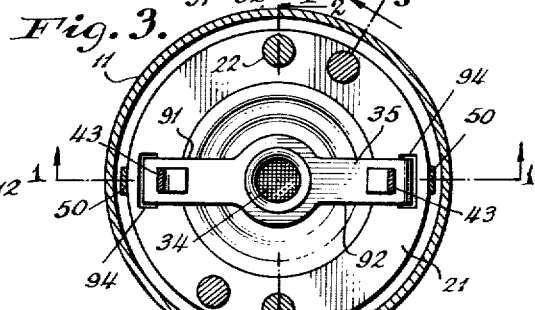
Fig. 3.
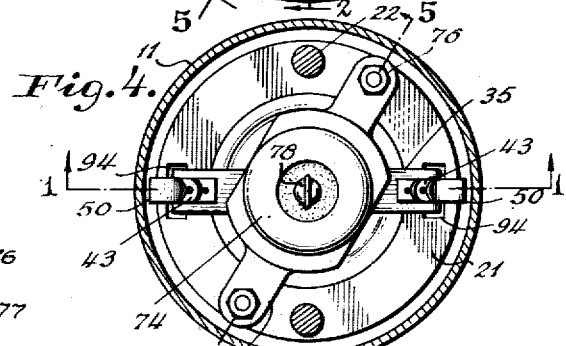
Fig. 4.
Fig. 5.
INVENTOR
COLEMAN DODD
BY Paul B. Hunter
ATTORNEY Nov. 20, 1951  C. DODD  2,575,334
HIGH-FREQUENCY TUNING APPARATUS
Filed March 14, 1944  3 Sheets-Sheet 2
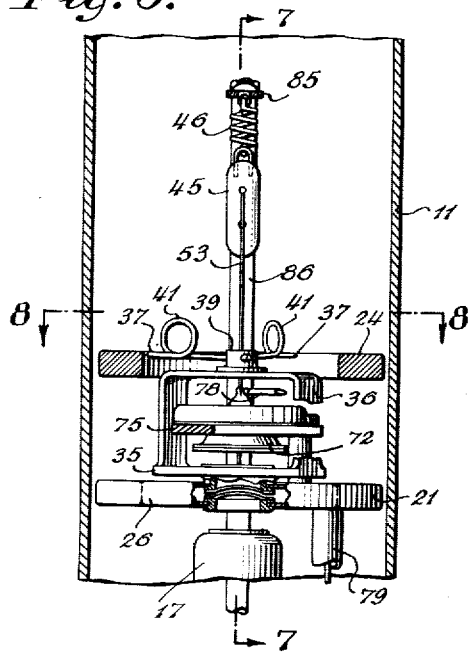
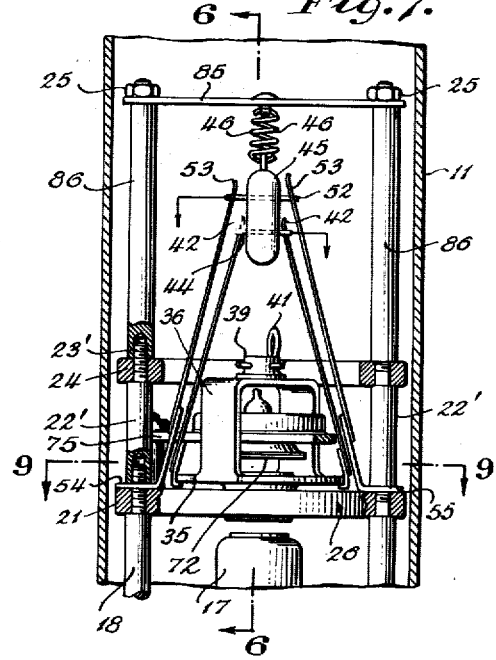
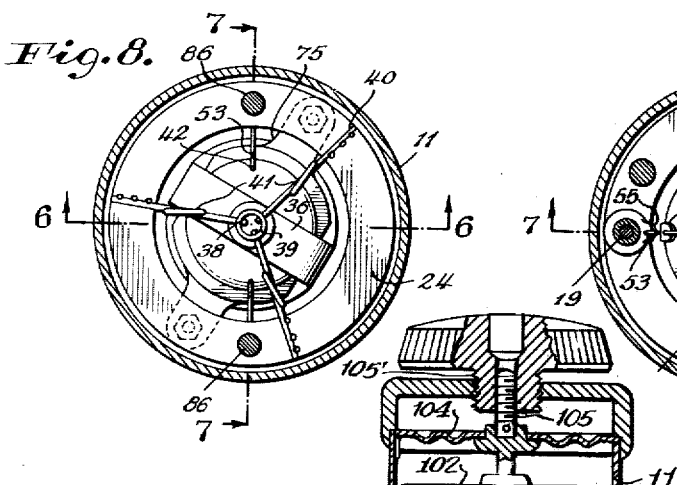
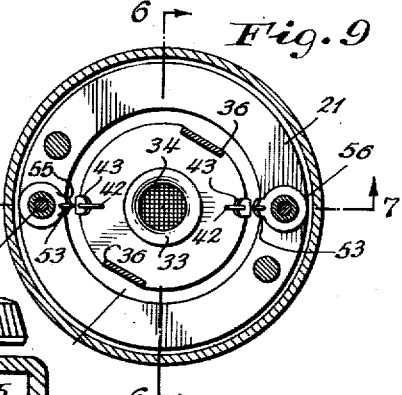
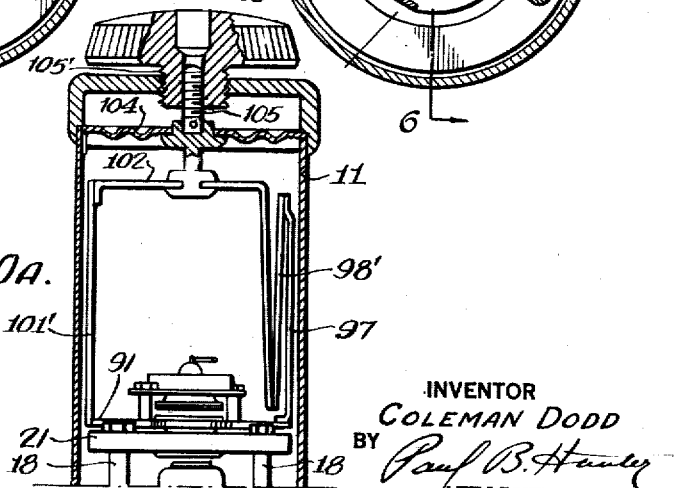
INVENTOR
COLEMAN DODD
BY
ATTORNEY Nov. 20, 1951     C. DODD     2,575,334
HIGH-FREQUENCY TUNING APPARATUS
Filed March 14, 1944     3 Sheets-Sheet 3
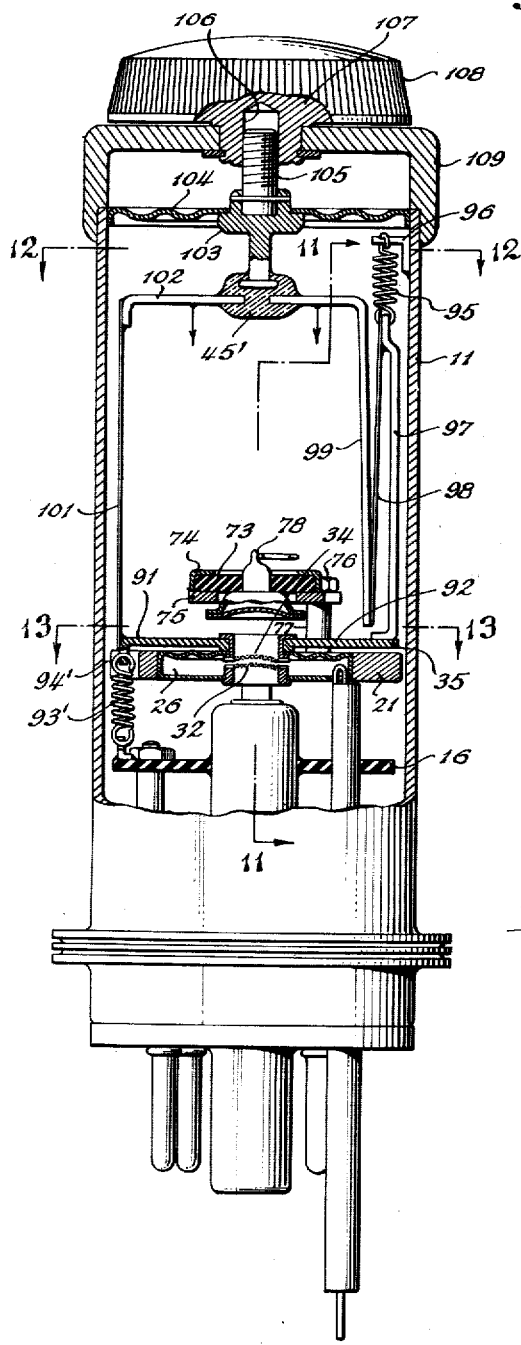
INVENTOR
COLEMAN DODD
BY
ATTORNEY Patented Nov. 20, 1951

2,575,334

UNITED STATES PATENT OFFICE 2,575,334

HIGH-FREQUENCY TUNING APPARATUS

Coleman Dodd, Hempstead, N. Y., assignor to The Sperry Corporation, a corporation of Delaware Application March 14, 1944, Serial No. 526,452

23 Claims. (Cl. 315—5)

This invention relates to high frequency apparatus of the type employing cavity resonators and, more particularly, to frequency control arrangements for such apparatus.

According to the invention, exceptionally speedy frequency control of a cavity resonator device is accomplished by providing a plurality of electrically controlled, thermally sensitive members which act independently to vary the resonator frequency in opposite directions. Also, a special resonator frequency adjustment operated by a manual control outside the envelope is provided for obtaining frequency regulation independently of the electrically controlled thermally responsive members.

It is therefore a major object of the invention to provide a cavity resonator device having novel electrically controlled frequency regulating arrangements.

Another object of the present invention is to provide a cavity resonator electron discharge device having improved thermally sensitive frequency control arrangements.

A further object of the invention is to provide a novel, compact and efficient association of cavity resonator and frequency control elements within an evacuated envelope.

It is a still further object of the invention to provide a novel electron discharge cavity resonator device having special electrically controlled thermally sensitive means within an evacuated envelope containing the resonator for independently varying the resonator frequency in opposite directions and which may have associated externally accessible, manually controllable frequency regulating means for preselecting a reference or datum frequency condition of said resonator independently of energization of said thermally responsive means.

Another object of the invention is to provide a novel manually operable external frequency control for varying the frequency of a hollow resonator mounted within an evacuated envelope.

It is a further object of the invention to provide improved cavity resonator electron discharge tube structure.

Still another object of the present invention is to provide independently actuatable manual and electrical tuning apparatus for cavity resonators.

Further objects of the invention will presently appear as the description proceeds in connection with the appended claims and the annexed drawings, wherein:

Fig. 1 is an elevational view, partly in section, of one form of the present invention as viewed along line 1—1 of Fig. 3, illustrating frequency control mechanism for a cavity resonator device according to a preferred embodiment of the invention;

Fig. 2 is an elevational view, partly in section, of a portion of the device of Fig. 1, the section being taken at right angles to the view of Fig. 1 and along line 2—2 of Fig. 1 and of Fig. 3;

Fig. 3 is a section in plan along line 3—3 of Fig. 1;

Fig. 4 is a further section in plan along line 4—4 of Fig. 1;

Fig. 5 is a fragmentary elevation, partly in section, taken along line 5—5 of Fig. 4 and showing the support for the reflector electrode of the device;

Fig. 6 is an elevational view, partly in section, of another form of the invention, the section being taken along line 6—6 of Figs. 7, 8 and 9;

Fig. 7 is an elevational view, partly in section, at right angles to the view of Fig. 6, the section being taken along line 7—7 of Figs. 6, 8 and 9;

Fig. 8 is a plan section along line 8—8 of Fig. 6;

Fig. 9 is a plan section along line 9—9 of Fig. 7;

Fig. 10 is an elevational view, partly in section, of a further form of the invention in which the normal or mid-frequency of the device may be manually set from outside the envelope;

Fig. 10A shows a slight modification of Fig. 10.

Fig. 11 is an elevational view, partly in section, taken at right angles to Fig. 10, the section being along line 11—11 thereof;

Fig. 12 is a plan section taken at line 12—12 of Fig. 10; and

Fig. 13 is a plan section taken at line 13—13 of Fig. 10.

Referring to Figs. 1 to 5, a cylindrical envelope 11, which may be of metal, is secured as by a vacuum-tight joint indicated at 12 to a pronged base 13 of the usual vacuum tube type. A plurality of spaced posts, one of which is shown at 14 in Fig. 1, are rigidly carried by the base 13 within the envelope 11 and themselves rigidly support an insulating supporting member 16 on which is mounted a suitable cathode or electron gun assembly 17 for projecting a stream of electrons parallel to the axis of envelope 11. A further plurality of spaced posts, one of which is illustrated at 18 in Fig. 2, also upstand rigidly from the base 13. Two such posts 18 are shown, although preferably, three equally circumferentially spaced posts 18 are provided, and the upper end of each post is reduced at 19 to extend through a suitable aperture in an annular resonator support 21. The reduced post ends 19 are threaded to fit into a tapped axial bore at the lower end of further posts 22 so that support 21 is rigidly clamped between posts 18 and posts 22. The upper end of each post 22 is similarly reduced in diameter to extend through a suitable aperture in a plate 85. The ends 23 are threaded for receiving respective nuts 25, whereby plate 85 is fixed to the top ends of post 22. Posts 18 and 22, support 21 and plate 85 thus provide a sturdy nonmicrophonic frame upstanding from base 13, and substantially all the parts within the envelope 11 are mounted on this frame.

Annular resonator support 21 is preferably coaxial with the electron stream from cathode or electron gun assembly 17. A flat, shallow, substantially cylindrical hollow or cavity resonator member 26 is fixed to support ring 21 as by soldering its peripheral side wall 27 directly to the internal cylindrical surface of support ring 21. Resonator 26 is thereby mounted on ring 21 with its axis coincident with that of the electron stream. Lower resonator end wall 28 is rigid and is centrally apertured in alignment with the electron stream from cathode 17. Secured in this aperture of wall 28 is a small collar insert 31 on which is mounted a wire mesh or other form of grid 32.

The other end wall 29 of resonator 26 is flexible, preferably comprising generally parallel, annularly crimped radially inward extensions of side wall 27, although it may be formed as a separate flexible diaphragm soldered to side wall 27. The resonator walls, including wall 29, are preferably of copper which is highly conductive and still sufficiently resilient so that wall 29 will tend to retain its illustrated pre-form shape against small displacements. This will be a useful property in the invention, as will appear. Wall 29 is also centrally apertured in alignment with grid 32 and the electron stream. A collar 33 is similarly secured within the aperture in upper wall 29 and carries a second similar grid 34. Grids 32 and 34 are preferably portions of two similar translated spheres and are coaxial with the electron stream. They are thus pre-bowed so as to prevent undesired distortion of the gap therebetween by buckling when heated by electron impact during operation of the device.

A centrally apertured, radially extending plate 35 has its inner periphery suitably clamped by collar 33 to the central region of upper resonator wall 29. Plate 35 has two radially extending arms 91 and 92 which are urged downward by springs 93 anchored at one end to the rigid support 16 and passing through suitable apertures 94 in support 21 to the arms 91 and 92 of plate 35. Springs 93 urge plate 35 downwardly, thereby tending to urge grid 34 toward grid 32. This downward displacement of plate 35 and grid 34 is resisted by the resiliency of wall 29 and also by a pair of thermally expansible wires or strips 42 which have their lower ends anchored to plate 35, as at 43, and their upper ends welded or similarly fixed to opposite ends of a short conductor bar 44 centrally imbedded in an insulating body 45 of glass or the like. A tension spring 46 is connected at its lower end to an eye member 47 rigid with glass body 45 and at its upper end to a suitable pin 48 rigid with the plate 85. A second conductor bar 52, centrally imbedded in glass body 45 has its opposite ends welded to the upper ends of a second pair of thermally responsive flexible wires or strips 53 which have their lower ends anchored to ring 21 as shown at 50. Spring 46 is made stronger than the total of all the springs 93 so that it serves to keep wires 53 taut. Springs 93, however, serve to keep wires 42 taut.

A suitable arcuate metal reflector electrode 72 is rigidly mounted within envelope 11 in axial alignment with the electron stream emerging from grid 34. As shown in Fig. 5, reflector 72 is fixed to an insulation disc 73 secured as by a sheet metal ring 74 upon a support plate 75 which is secured by fastening elements 76 upon the upper ends of a pair of posts 77 fixed as desired either to support 21 or support 16, or directly to base 13. A suitable potential is applied to reflector 72 as by lead 78. Conducting bars 44 and 52 and lead 78 are suitably connected to individual prongs of base 13, these connections not being shown, since their details comprise no part of the present invention. In this way, wires 42 are in parallel, being energized from bar 44, their opposite ends being both grounded to plate 35. Similarly, wires 53 are in parallel. A suitable coaxial line 79 coupled to the resonator field by a loop 81 extends through the base 13 in vacuumtight relation and enables extraction of high frequency energy from resonator 26.

The present device is similar to that described in Fig. 2 of Varian Patent No. 2,250,511, issued July 29, 1941. In such devices, the electron beam, upon passage through the gap between grids 32 and 34, is periodically varied in velocity by the alternating high frequency field existing in resonator 26 and appearing at this gap. Reflector 72 is maintained at a suitable negative potential with respect to resonator 26 and thereby reverses the electron stream and causes it to re-enter the gap between grids 32 and 34. By suitable choice of the relationship among the initial electron velocity, the resonant frequency of resonator 26, and the potential and spacing of reflector electrode 72, self-sustained oscillations are produced in resonator 26. The resultant radio frequency energy may be extracted therefrom by output coaxial line 79. The output frequency of the device depends on the resonant frequency of resonator 26, and the present invention is directed especially toward an improved apparatus for controlling this resonant frequency.

In operation, if it be assumed that wires 42 are heated by passage of current therethrough, they will elongate by thermal expansion, thereby permitting springs 93 to draw plate 35 downward so that grid 34 approaches grid 32. This action decreases the resonant frequency of resonator 26 with a corresponding change in the output frequency of the device. During this action, glass body 45 is held stationary due to the wires 53 which oppose the pull of spring 46. A decrease in energization of wires 42 from an energized condition will permit them to contact as their temperature decreases due to decreased energization, and thus will cause grid 34 to move away from grid 32, against the pull of springs 93 thereby increasing the resonant frequency of resonator 26.

This type of action is used in prior devices but has several disadvantages. Firstly, it is necessary to maintain the thermal tuning wires such as 42 at substantially half energization when at the normal or mid-frequency, in order to be able to change the frequency in both directions by increase or decrease of the excitation of these wires. This causes a continuous and undesirable power drain and also renders the device sensitive to changes in ambient temperature, since the length of the thermal wires depends on their temperature which, in turn, depends on their power dissipation and thus on the temperature of surrounding parts to which they are conductively connected, or to whose heat radiation they are exposed.

A further and more serious disadvantage resides in the fact that unequal rates of tuning are obtained in the two directions. Tuning by increasing excitation is quite rapid, as is desirable in such uses as automatic frequency control, where it provides a sensitive adjustment without substantial overshooting of the final desired frequency. However, tuning by decreased excitation is relatively slow, with corresponding disadvantages. These disadvantages of the prior devices are substantially overcome by the present invention in which, as will be seen, tuning in both directions is effected by increase in thermal wire excitation. Thus, if wires 53, which are also electrically and mechanically in parallel, are heated or have their energization increased by passage of electric current therethrough, they will elongate, thereby permitting spring 46 to displace glass body 45 upwardly. This motion is transmitted through wires 42 and plate 35 to increase the gap between grids 32 and 34 and thus increase the frequency of resonator 26. The use of pairs of symmetrically disposed wires such as 42 and 53 insures that displacement of grids 32 and 34 is substantially parallel, which is helpful to reliable frequency control.

In this way, rapid tuning control in both directions is possible, since tuning in each direction is primarily caused by increase of excitation of the respective sets of wires. Any suitable electrical circuit connected to the socket into which the base prongs are inserted can be employed to selectively or differentially pass current through either of the conductor pairs 42 or 53 or to energize one more than the other. No illustration of such circuits appears necessary to understand the present invention, which concerns the improved frequency control and other structural features of the cavity resonator device.

Thus, in the present invention, a substantial saving in power is effected since both wires may remain normally unenergized, only being energized when a frequency differing from the normal resonator frequency is desired. Also, better temperature stability can be maintained, since any change in the temperature of the device, such as by heating during operation or by change in ambient temperature which may be conductively or radiatively transferred to the wires 42 and 53, will cause corresponding elongations or contractions of both sets of wires. Due to the opposite manners in which these wires operate to control frequency, this will leave grid 34 substantially unchanged, resulting in no frequency change.

In the embodiment of the invention illustrated in Figs. 6 to 9, substantially the same type of operation is obtained. In this instance, however, instead of utilizing springs 93 passing through the openings 94 in support 21 as in Figs. 1 to 5, an inverted U-shaped bracket 36 has the ends of its depending legs fixed as by welding to plate 35. Also, a support ring 24 is connected at the top of short struts 22' similar to struts 22 of Fig. 2. Supporting plate 85 is then mounted on support 24 by similar struts 86. Bracket 36 is resiliently connected to support ring 24 as by a plurality of radially extending spring levers 37, each having an outer end staked or similarly fixed to ring 24 as shown in Fig. 8 at 40, and an inner end slidably projecting through suitable parallel, longitudinal slots 38 formed in a small tubular collar 39 fixed to the bridge of bracket 36. Each spring lever 37 is preferably formed with an intermediate coil 41 so as to increase its effective length and strength. Spring levers 37 combine to urge bracket 36 and plate 35 downwardly and thus perform the same function as springs 93 of Fig. 1. Otherwise, the embodiment of Figs. 6 to 9 is the same as that of Figs. 1 to 5.

One disadvantage of the type of apparatus shown in Figs. 1 to 9 is that it is difficult to preselect the initial or normal frequency of resonator 26 corresponding to the deenergized condition of the wires 42 and 53. The embodiment illustrated in Figs. 10 to 13 overcomes this disadvantage by providing a mechanical tuning control external of the envelope in addition to a dual thermal tuning control similar to those described in the above figures.

Thus, in Fig. 10, plate 35 is normally urged upwardly at one end by means of a tension spring 95 engaged at its upper end to a bracket 96 fixed to the envelope 11, and at its lower end to an arm 97 rigidly connected as by welding to plate 35 at its lower end. The upward motion of plate 35 is opposed by a thermally expansible wire or strip 98 connected between the upper end of arm 97 and the lower end of a further rigid member 99 whose upper end is rigidly fixed to an insulating body 45'.

Plate 35 is also urged downwardly at its other end by a tension spring 93' passing through an opening 94' in supporting member 21 and fixed to arm 91 and plate 16. This downward motion of plate 35 is opposed by a second tuning wire 101 fixed at the lower end to plate 35 and at the upper end to a member 102 rigidly supported by glass body 45'. Suitable current input leads are connected between each of members 99 and 102 and the base prongs.

Thus, heating of wire 98, by passing current therethrough permits it to expand and allows spring 95 to draw plate 35 upwardly, thereby increasing the spacing between grids 34 and 32. Similarly, increased energization of wire 101, increasing its temperature, causes it to expand, permitting spring 93' to draw plate 35 and grid 34 downwardly, thus obtaining the desired bidirectional tuning in a manner similar to the preceding figures.

At the same time glass body 45' is fixed to a centrally located button 103 sealed into a diaphragm 104 serving as one part of the evacuated envelope 11. Fixed to button 103 is a threaded member 105 which engages an internal thread 106 in a member 107 connected to an external manual frequency control means or knob 108 and rotatably supported on an extension or cap 109 of the outer cylindrical walls of envelope 11. Turning of knob 108 thereby causes threaded member 105 to move upwardly or downwardly, thereby moving glass 45' upwardly or downwardly. Upon motion of glass body 45 upwardly, this motion is transmitted through wire 101 to plate 35, overcoming the tension of spring 93' and moving plate 35 and grid 34 upwardly. At the same time, wire 98 is relaxed by the upward motion of its lower end, permitting spring 95 to take up the slack and thereby also to draw up its end of plate 35 and to move grid 34 up.

Upon motion of glass body 45' downward, spring 93' takes up any slack in wire 101, and member 99 and wire 98 stretch spring 95, thereby causing plate 35 and grid 34 to move downwardly to produce an opposite sense of frequency variation for the resonator 26. In this way a manual adjustment of the resonant frequency of resonator 26 may be made independently of any other frequency control provision. A differential screw arrangement may, of course, be used in place of the threaded members 105 and 106 to gain finer frequency control, as shown by the threaded members 105 and 105' in Fig. 10A.

In this way the operating frequency point of the resonator can be mechanically preset without energizing either wire 101 or wire 98. Selective energization, either automatically or manually, of either of the wires 98 or 101 will then serve to quickly vary the resonator frequency over an appreciable range without disturbing the manually preset frequency. The remainder of the structure of Figs. 10 to 13 is similar to that described in the preceding figures, similar elements being given the same reference characters, and need not be repeated here in detail.

It should be further understood that the embodiment shown in Figs. 10 to 13 can be made more stable mechanically by the use of two or more thermal elements like wires 101 and 98. In the embodiments of Figs. 1 to 9 and Figs. 10 to 13 an arrangement is provided for varying the resonant frequency of resonator 26. In referring to a change in the frequency of resonator 26, it will be understood that by the term "sense" is meant a variation in frequency, which variation may only, of course, take the form of an increase or a decrease. For instance, in connection with Fig. 10 an increase in the energization of wire 98 results in an increase of frequency of resonator 26, while an increase in the energization of wire 101 results in a decrease of frequency. With selective energization of wires 98, 101, the frequency may be increased or decreased. Thus, under such circumstances the frequency may be changed in opposite senses.

While the above embodiments of the invention show frequency control of a "Reflex Klystron," it is to be understood that the present invention may be used wherever it is desirable to produce frequency control of a cavity resonator, not necessarily restricted to electron discharge devices. Thus, a cavity resonator and its control as described above may be used in a resonant cavity filter circuit in which high frequency energy is fed into and out of the resonator. The flow of energy through the system may thus be regulated by controlling the resonant frequency of the resonator. Also, such tuning may be used with many other types of cavity resonator devices.

Also in each of the above embodiments, the flexible wires may be replaced by rigid, thermally-expansible struts, in which case the various spring loading devices may be omitted. For example, the wires 98 and 101 of Fig. 10 may be rigid, thermally-expansible struts 98' and 101', respectively, as shown in Fig. 10A.

What is claimed is:

1. High frequency apparatus comprising a hollow resonator having a pair of wall portions which are relatively movable for varying the frequency of said resonator, spaced members rigid with said respective wall portions, an insulating body resiliently connected to one of said members substantially in alignment with the path of movement of said wall portions, two pairs of symmetrically disposed, flexible thermally sensitive conductors, each pair having one pair of ends anchored to said insulating body, said two pairs of ends being insulated from each other, and means operably connecting the other ends of each of said pairs of conductors to a respective one of said members, whereby the resonant frequency of said resonator is varied by the passage of current through said conductors.

2. Electron discharge apparatus comprising a deformable hollow resonator arranged to contain an alternating electromagnetic field and means for passing a stream of electrons therethrough in energy-exchanging coupling with said alternating field, an envelope providing a vacuum-tight enclosure for said resonator and electron stream, two pairs of symmetrically disposed thermally sensitive expansible and contractible electrical conductors within said envelope, means connecting a pair of ends of each of said pairs of conductors and means connecting the other ends of said conductors to said resonator, whereby said resonator is deformed to accomplish changes in resonator frequency in opposite senses upon electrical energization of the respective pairs of conductors.

3. Electron discharge apparatus comprising a cavity resonator, means in said apparatus operably connected to said resonator and shiftable for varying the oscillation frequency of said resonator, and means for selectively independently varying the resonator frequency in opposite senses comprising two sets of flexible thermally sensitive expansible and contractible members operably connected to said shiftable means, each said set of flexible members comprising a plurality of flexible conductors electrically connected in parallel and mechanically connected to said shiftable means in symmetrical array to exert substantially uniformly distributed force on said shiftable means.

4. High frequency apparatus comprising a hollow resonator having relatively movable wall portions, tuning means for said resonator comprising two sets of thermally-sensitive electrically extensible conductors, insulating means supporting one end of each of said conductors at points spaced from said resonator, and means connecting the other ends of each of said conductors operably connected to said wall portions, said sets being symmetrically disposed with respect to said wall portions, whereby upon selective energization of said sets of conductors relative motion of said resonator wall portions in linear fashion is obtained for varying the resonator frequency in opposite senses.

5. High frequency apparatus comprising a support, a hollow resonator mounted on said support and having two wall portions which are relatively movable for varying the frequency of said resonator, an insulator body carried by said support and spaced from said resonator and two pairs of symmetrically disposed thermally-sensitive members, the ends of each of said members being connected to said wall portions, the other ends of each of said members being connected to said body, whereby upon selective energization of said members relative motion of said wall portions in linear fashion for independently varying the resonator frequency in opposite senses is obtained.

6. High frequency apparatus comprising a cavity resonator having a relatively fixed portion and a relatively movable portion for varying the resonant frequency thereof, a vacuum envelope containing said resonator, an insulating member within said envelope, flexible electrically extensible linear means connected between said insulating member and said movable portion, resilient means coupled to said flexible extensible means for maintaining said flexible extensible means in a straight taut condition, further flexible electrically extensible linear means connected between said movable portion and said insulating body and adapted when extended to move said movable portion in a direction opposite to that produced upon an extension of said first extensible means, and further resilient means coupled to said further extensible means for maintaining said further extensible means in a taut condition, whereby upon selective energization of said two extensible means corresponding respective directions of motion of said movable portion is obtained to control the resonant frequency of said resonator.

7. Apparatus as in claim 6, further including manual control means external of said envelope for adjusting said insulating body whereby said movable portion may be manually adjusted independently of said electrical control.

8. High frequency apparatus comprising an evacuated envelope, a cavity resonator mounted within said envelope and having a pair of relatively movable wall portions, an insulating mounting means located within said envelope, resilient means coupled to said wall portions and said mounting means and urging said wall portions together, a flexible straight thermally expansible member interconnected between said wall portion and said mounting means and opposing said motion, further resilient means coupled to said wall portions and urging said wall portions apart, and a further flexible thermally expansible straight member interconnected between said wall portions to oppose said motion apart whereby, upon selective energization of either of said thermally expansible members, a corresponding sense of tuning of said resonator is obtained.

9. High frequency apparatus comprising a supporting means, a hollow resonator mounted on said supporting means having a wall portion movable for varying the oscillation frequency of said resonator, a mounting member disposed adjacent said supporting means, a pair of flexible thermally sensitive expansible and contractible members each having one end anchored to said mounting member in electrically insulated relation, means connecting the other ends of said flexible members to said supporting means and movable resonator wall portion respectively, means resiliently connecting said mounting means to said supporting means for maintaining said flexible members taut, and manually operable means operably connected to said movable wall portion to vary the oscillation frequency of said resonator independently of actuation of said thermally sensitive means.

10. High frequency apparatus comprising an evacuated envelope, a tunable hollow resonator device within said envelope, a first thermally extensible member operably connected to said device within said envelope and energizable for varying the resonator frequency in one sense, a second thermally extensible member operably connected to said device within said envelope and energizable for varying the resonator frequency in the opposite sense, manually operable means mounted on said envelope exteriorly thereof and motion-transmitting mechanism interconnected between said manually operable means and one of said thermally sensitive members for varying the resonator frequency independently of the degree of energization of said thermally sensitive members.

11. Apparatus as defined in claim 6, further including an external manual frequency control means movably mounted on said envelope, said envelope having a flexible wall region, said manual frequency control means being connected to said movable portion of said resonator through said flexible wall region.

12. Apparatus as defined in claim 6, further including an external frequency control means, and motion transmitting means interconnecting said frequency control means and said movable portion of said resonator.

13. Apparatus as defined in claim 12, wherein said motion transmitting means includes at least one of said flexible electrically extensible linear means.

14. Apparatus as defined in claim 8 wherein there is provided manually operable means connected to vary the tuning of said resonator independently of the energization of said thermally expansible members.

15. Apparatus as defined in claim 8 further including an external frequency control member movably mounted on said envelope, whereby independently of the energization of said thermally expansible members tuning of said resonator may be accomplished.

16. Apparatus as defined in claim 8 wherein there is additionally provided an external frequency control member mounted on said envelope, and motion transmitting means connected between said frequency control member and said insulating mounting means, whereby the frequency of said resonator may be additionally varied.

17. Apparatus as defined in claim 8 with said evacuated envelope having a flexible wall region, and further including an external frequency control member movably mounted on said envelope and operably connected to deform said flexible wall region, and motion transmitting means including said thermally expansible members connected between said flexible wall region and said relatively movable wall portions of said resonator.

18. Apparatus as defined in claim 8 wherein said evacuated envelope has a flexible wall region, and further including a manual frequency control means operably connected through said flexible wall region.

19. Apparatus as defined in claim 18 wherein said flexible wall region is a flexible end wall on said enevelope, and including a closure cap on said envelope extending over said flexible wall region and providing a mounting for said manual frequency control means.

20. Apparatus as defined in claim 8, further including manual frequency control means for tuning said resonator independently of said expansible members; said frequency control means including an external knob mounted on said envelope and motion transmitting means mainly located within said envelope.

21. The apparatus defined in claim 4 further characterized by means in said insulating means connecting the conductors of each of said sets electrically and substantially mechanically in parallel to provide stability of frequency control.

22. An electron discharge device including a cavity resonator having a rigid and a flexible wall for tuning, an envelope containing said resonator and having rigid supporting elements connected to said rigid resonator wall and having a flexible portion, an electrode rigidly connected to said flexible wall, rigid means connected between said electrode and said flexible portion, said rigid supporting elements and means for tuning said resonator comprising a differential screw mounted on the outside of said envelope and secured to said flexible portion.

23. An electron discharge device comprising an envelope having a rigid and a flexible wall, a cavity resonator mounted within said envelope and having a rigid and a flexible wall, supporting means rigidly connected between said rigid envelope wall and said rigid resonator wall, a first rigid connection between said flexible resonator wall and said flexible envelope wall, a second rigid connection outside said envelope between said flexible envelope wall and said rigid envelope wall, and means for adjusting the length of said second rigid connection for tuning said resonator.

COLEMAN DODD.

REFERENCES CITED

The following references are of record in the file of this patent:

UNITED STATES PATENTS

| Number | Name | Date |
|---|---|---|
| 1,559,714 | Lilienfeld | Nov. 3, 1925 |
| 1,658,953 | Theremin | Feb. 14, 1928 |
| 2,079,809 | Kuhle et al. | May 11, 1937 |
| 2,093,331 | Lynn | Sept. 14, 1937 |
| 2,167,201 | Dallenbach | July 25, 1939 |
| 2,259,690 | Hansen et al. | Oct. 21, 1941 |
| 2,374,810 | Fremlin | May 1, 1945 |
| 2,380,496 | Beard | July 31, 1945 |
| 2,429,243 | Snow et al. | Oct. 21, 1947 |
| 2,438,132 | Snow | Mar. 23, 1948 |
| 2,439,387 | Hansen et al. | Apr. 13, 1948 |

Certificate of Correction

Patent No. 2,575,334 — November 20, 1951

COLEMAN DODD

It is hereby certified that error appears in the printed specification of the above numbered patent requiring correction as follows:

Column 4, line 58, for "contact" read *contract*; column 8, lines 42 and 43, strike out "operably connected"; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*